United States Patent
Suarez et al.

[11] Patent Number: 6,106,643
[45] Date of Patent: Aug. 22, 2000

[54] HOT WORKING HIGH-CHROMIUM ALLOY

[75] Inventors: Francis Sardovia Suarez, Huntington; Donald Edward Camus, Ona; William Lawrence Mankins, Huntington, all of W. Va.

[73] Assignee: Inco Alloys International, Inc., Huntington, W. Va.

[21] Appl. No.: 09/105,474

[22] Filed: Jun. 26, 1998

Related U.S. Application Data

[63] Continuation-in-part of application No. 08/943,293, Oct. 14, 1997, abandoned.

[51] Int. Cl.[7] ............................................. C22F 1/18
[52] U.S. Cl. ............................................ 148/668; 148/676
[58] Field of Search ............................ 148/668, 675–677

[56] References Cited

FOREIGN PATENT DOCUMENTS

| | | |
|---|---|---|
| 58-202993 | 11/1983 | Japan . |
| 60-037290 | 2/1985 | Japan . |
| 5001344 | 1/1993 | Japan . |
| 7011366 | 1/1995 | Japan . |
| 7070680 | 3/1995 | Japan . |
| 9-256087 | 9/1997 | Japan . |

*Primary Examiner*—John Sheehan
*Attorney, Agent, or Firm*—Webb Ziesenheim Logsdon Orkin & Hanson, P.C.; Robert F. Dropkin, Esq.

[57] ABSTRACT

Hot working a nickel-chromium alloy that contains by weight percent, 42 to 65 chromium, 0.002 to 0.1 calcium, 0.002 to 0.1 magnesium, 0 to 2 aluminum, about 0 to 5 cobalt, 0 to 3 copper, 0 to 5 iron, 0 to 5 manganese, 0 to 3 molybdenum, 0 to 3 niobium, 0 to 2 silicon, 0 to 3 tantalum, 0 to 5 titanium, 0 to 5 tungsten, 0 to 5 vanadium, 0 to 1 zinc, 0 to 0.2 carbon 0 to 0.1 silver, 0 to 0.1 cerium, 0 to 0.1 phosphorus, 0 to 0.1 sulfur, less than 0.005 total boron, rare earths and zirconium and balance nickel and incidental impurities, at a temperature of at least 800° C. improves formability for α-phase chromium alloys.

7 Claims, 3 Drawing Sheets

HOT WORKING HIGH-CHROMIUM ALLOY

This application is a continuation-in-part of application Ser. No. 08/943,293 filed on Oct. 14, 1997 now abandoned.

TECHNICAL FIELD

1. Field of Invention

This invention relates to the field of hot working nickel-chromium alloys. In particular, this invention relates to hot working nickel-base alloys having at least 42 weight percent chromium.

2. Background Art

Nickel-chromium weld deposits provide excellent resistance to corrosion at high temperatures. For example, INCONEL® filler metal 72, produces a stable-corrosion-resistant weld deposit. (INCONEL is a trademark of the Inco group of companies.) Filler metal 72 nominally contains, by weight percent, 55 nickel, 44 chromium, 0.6 titanium, 0.2 copper, 0.2 iron, 0.1 manganese, 0.1 silicon, 0.05 carbon and 0.008 sulfur. This composition provides a weld deposit for joining alloy 671 and a feed wire for spray-coating corrosion resistant surfaces. The deposited metal is resistant to high temperature corrosion, including fuel-ash corrosion in atmospheres containing sulfur and vanadium.

These nickel-chromium filler metals, having above 42 weight percent chromium, typically have high levels of α-phase chromium. These high levels of α-phase chromium lower the high temperature ductility of the nickel-base alloys. Rolling these low-ductility alloys into wire fractures or slivers the alloy longitudinally. Therefore, these alloys often require shaving to eliminate the slivered surface prior to any drawing procedure. Unfortunately, the shaving operation adds to the cost of the wire and reduces yield.

These high-chromium alloys typically rely upon the addition of magnesium for increasing high temperature workability. The magnesium "cleans" the metal by changing the morphology of sulphide stringers into less-harmful spherical sulfides. This improved morphology however, still suffers from the hot-slivering problem.

It is an object of this invention to provide an alloy having sufficient hot workability for hot rolling bar into wire without "slivering".

It is a further object of the invention to increase the temperature range for hot working high-chromium-nickel-base alloys.

It is further object of the invention to increase the hot ductility of high-chromium-nickel-base alloys without significantly decreasing the hot strength of the alloys.

SUMMARY OF THE INVENTION

The ductile nickel-chromium alloy contains by weight percent, 42 to 65 chromium, 0.002 to 0.1 calcium, 0.002 to 0.1 magnesium, 0 to 2 aluminum, about 0 to 5 cobalt, 0 to 3 copper, 0 to 5 iron, 0 to 5 manganese, 0 to 3 molybdenum, 0 to 3 niobium, 0 to 2 silicon, 0 to 3 tantalum, 0 to 5 titanium, 0 to 5 tungsten, 0 to 5 vanadium, 0 to 1 zinc, 0 to 0.2 carbon 0 to 0.1 silver, 0 to 0.1 cerium, 0 to 0.1 phosphorus, 0 to 0.1 sulfur, less than 0.005 total of boron, rare earths and zirconium and balance nickel and incidental impurities. Hot working objects of this alloy, such as bar stock, at temperatures above 800° C. eliminates the surface cracking often associated with fabricating similar α-phase chromium alloys.

DESCRIPTION OF PREFERRED EMBODIMENT

Figure 1:
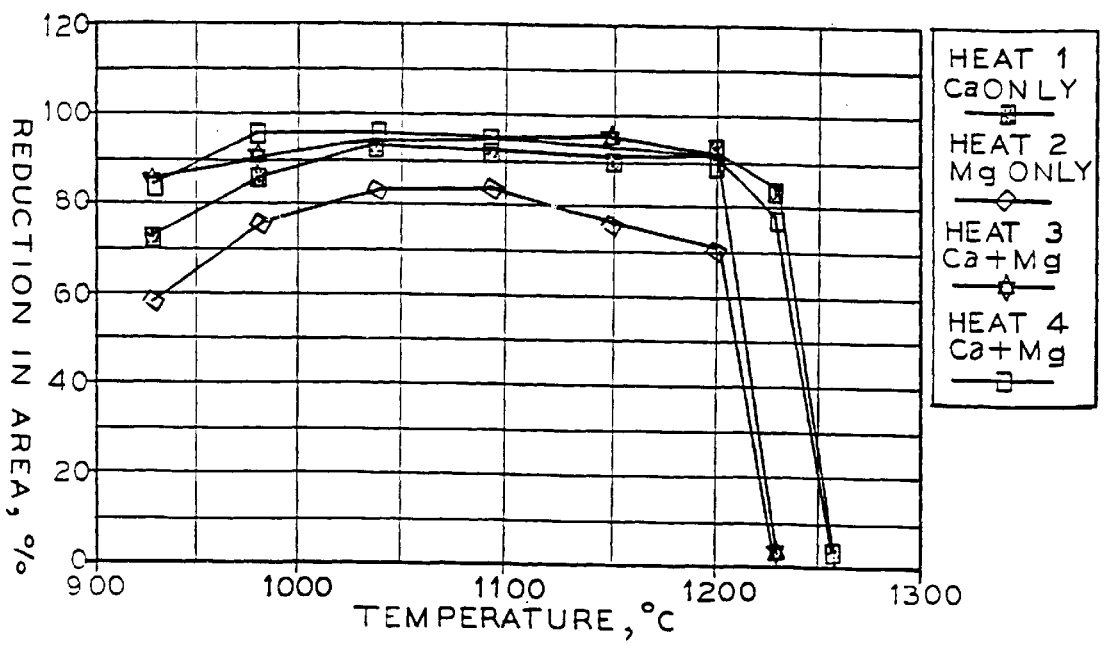
FIG. 1 illustrates the ductility increase arising from using calcium and magnesium in "as-hot-rolled" nickel-base alloys containing α-phase chromium.

The invention uses a combination of two alkaline earth metals to increase hot workability. Furthermore, maintaining a low total concentrations of boron, rare earths and zirconium enhances the hot workability range of the alloy. Specifically, a small but effective amount of calcium and magnesium increase hot workability without decreasing tensile strength. This combination of alkaline earth metals unexpectedly improves hot workability or hot working of the alloy. For purposes of this specification, hot working is defined as deforming an alloy above its recrystallization temperature. Specifically calcium and magnesium act to reduce or eliminate the slivering of the alloy during hot rolling to wire. Furthermore, maintaining low concentrations of boron, rare earths and zirconium reduces detrimental grain boundary precipitates to ensure an excellent hot workability range for the high-chromium alloy. For purposes of this specification, rare earth metals consist of the elements with atomic numbers 57 to 71 and yttrium.

Hot rolling six lab heats (heats 1 to 5 and A) into 0.665" inch (1.67 cm) diameter rounds provided the test samples. Similarly, one commercial-scale heat (heat B), produced by deoxidizing with calcium and magnesium, tested actual mill conditions by hot rolling to 6.4 mm (0.250 in.) wire. Heats 1 to 5 correspond to comparative heats having improved hot workability. Heats A and B correspond to examples that illustrate enhanced workability sufficient for the most demanding hot rolling conditions, such as hot rolling wire. Table 1 below provides the chemistries of the heats tested.

TABLE 1

| | HEAT NO. | | | | | | |
|---|---|---|---|---|---|---|---|
| ELEMENT | 1 | 2 | 3 | 4 | 5 | A | B |
| Ag | 0.0001 | 0.0001 | 0.0001 | 0.0001 | N/A | N/A | <0.001 |
| Al | 0.20 | 0.12 | 0.13 | 0.15 | 0.132 | 0.121 | 0.11 |
| B | 0.0065 | 0.0062 | 0.0064 | 0.0068 | 0.008 | 0.0001 | 0.0023 |
| C | 0.027 | 0.024 | 0.023 | 0.024 | 0.029 | 0.022 | 0.011 |
| Ca | 0.0170 | 0.0002 | 0.0034 | 0.0380 | 0.002 | 0.003 | 0.0045 |

TABLE 1-continued

| | HEAT NO. | | | | | | |
|---|---|---|---|---|---|---|---|
| ELEMENT | 1 | 2 | 3 | 4 | 5 | A | B |
| Ce | 0.0001 | 0.0001 | 0.0001 | 0.0010 | 0.0000 | 0.0000 | 0.0000 |
| Co | 0.0001 | 0.0060 | 0.0001 | 0.0001 | 0.208 | 0.204 | 0.024 |
| Cr | 45.16 | 45.20 | 45.20 | 45.13 | 45.10 | 44.95 | 43.03 |
| Cu | 0.0680 | 0.0001 | 0.0001 | 0.0030 | 0.001 | 0.073 | 0.01 |
| Fe | 0.12 | 0.13 | 0.14 | 0.16 | 0.484 | 0.478 | 0.22 |
| Mg | 0.0011 | 0.0120 | 0.0130 | 0.0130 | 0.007 | 0.009 | 0.0072 |
| Mn | 0.002 | 0.003 | 0.002 | 0.002 | 0.002 | 0.003 | 0.0084 |
| Mo | 0.0030 | 0.0040 | 0.0030 | 0.0020 | 0.19 | 0.19 | 0.012 |
| Nb | 0.0140 | 0.0149 | 0.0140 | 0.0140 | 0.014 | 0.015 | 0.023 |
| Ni | 53.52 | 53.70 | 53.76 | 53.33 | 53.09 | 53.27 | 55.89 |
| P | 0.0022 | 0.0022 | 0.0022 | 0.0020 | 0.002 | 0.002 | 0.0016 |
| S | 0.0025 | 0.0042 | 0.0022 | 0.0028 | 0.0024 | 0.0025 | 0.0019 |
| Si | 0.220 | 0.058 | 0.083 | 0.230 | 0.104 | 0.075 | 0.04 |
| Ta | 0.0030 | 0.0030 | 0.0030 | 0.0030 | 0.002 | 0.002 | 0.0016 |
| Ti | 0.57 | 0.58 | 0.59 | 0.58 | 0.547 | 0.55 | 0.552 |
| V | 0.016 | 0.016 | 0.016 | 0.017 | 0.014 | 0.015 | 0.011 |
| W | 0.010 | 0.011 | 0.010 | 0.011 | 0.01 | 0.011 | 0.0060 |
| Y | 0.001 | 0.001 | 0.001 | 0.000 | NT | NT | NT |
| Zn | 0.0003 | 0.0003 | 0.0003 | 0.0001 | 0.0007 | 0.0007 | NT |
| Zr | 0.0037 | 0.0003 | 0.0015 | 0.0001 | 0.0124 | 0.0017 | 0.0002 |
| Total Rare Earths | 0.0002 | 0.0002 | 0.0002 | 0.0020 | 0.0000 | 0.0000 | 0.0000 |

Note: NT means not tested.

Table 2 below provides the reduction in area data for Gleeble testing of "as hot-rolled" alloys at temperatures between 1700 and 2300° F. (927 and 1260° C.).

TABLE 2

| | | REDUCTION IN AREA (%) HEAT NO. | | | |
|---|---|---|---|---|---|
| TEMPERATURE | | 1 | 2 | 3 | 4 |
| (° F.) | (° C.) | (Ca only) | (Mg only) | (Ca + Mg) | (Ca + Mg) |
| 1700 | 927 | 75 | 59 | 89 | 87 |
| 1800 | 982 | 89 | 79 | 94 | 98 |
| 1900 | 1038 | 96 | 86 | 96 | 98 |
| 2000 | 1093 | 95 | 86 | 97 | 97 |
| 2100 | 1149 | 94 | 79 | 97 | 95 |
| 2200 | 1204 | 95 | 74 | 93 | 94 |
| 2250 | 1232 | 86 | 0 | 2 | 80 |
| 2300 | 1260 | 1 | — | — | 0 |
| 2350 | 1288 | — | — | — | — |

Note: The "as-hot-rolled" designation means testing the alloy after heating it to temperature.

FIG. 1 illustrates the unexpected beneficial effect of adding calcium and magnesium in combination to nickel-base alloys having relatively large amounts of α-phase chromium. This combination of alkaline metals produces a dramatic increase in ductility at temperatures between 1700 and 1800° F. (927 and 982° C.). This increase in ductility greatly extends the useful high temperature range for fabricating wires from high α-chromium alloys.

Table 3 below provides the reduction in area data testing of alloy "as hot-rolled and annealed"—test temperature between 1700° F. and 2100° F. (927 and 1149° C.) and an annealing temperature of 2200° F. (1204° C.).

TABLE 3

| | | REDUCTION IN AREA (%) HEAT NO. | | | |
|---|---|---|---|---|---|
| TEMPERATURE | | 1 | 2 | 3 | 4 |
| (° F.) | (° C.) | (Ca only) | (Mg only) | (Ca + Mg) | (Ca + Mg) |
| 1700 | 927 | 59 | 42 | 65 | 81 |
| 1800 | 982 | 66 | 42 | 74 | 78 |
| 1900 | 1038 | 72 | 54 | 81 | 83 |
| 2000 | 1093 | 81 | 79 | 88 | 90 |
| 2100 | 1149 | 88 | 76 | 97 | 92 |

Note: The "as hot-rolled and annealed" designation means testing the alloy after cooling it from 2200° F. (1204° C.).

Figure 2:
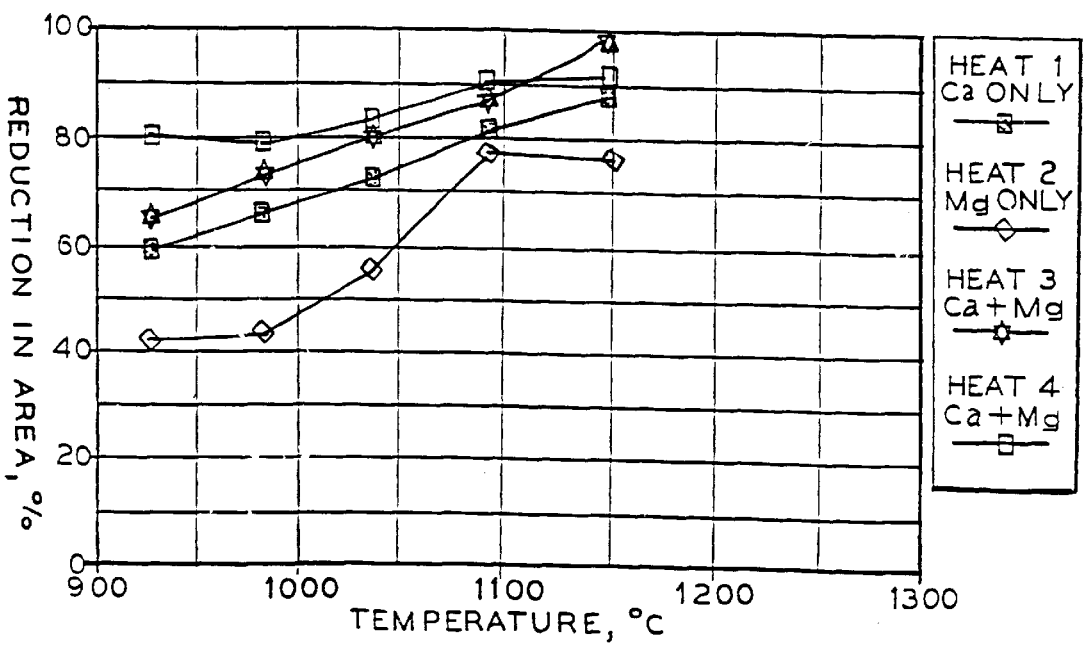
FIG. 2 illustrates the ductility increase arising from using calcium and magnesium in annealed nickel-base alloys containing α-phase chromium

FIG. 2, based upon the data of Table 3, shows that a combination of calcium and magnesium increases hot workability of the alloy in the annealed condition. The annealing process coarsens the grains of the alloy and can precipitate detrimental phases at the grain boundaries—this simulates the grain precipitates that form during processing ingots into bar stock. The combination of calcium and magnesium improved ductility under these more difficult working conditions.

Table 4 below illustrates that the combination of alkaline metals produced no significant drop in tensile strength for the as-hot-rolled alloy.

TABLE 4

| Temperature | | 1 (Ca only) | | 2 (Mg only) | | 3 (Ca + Mg) | | 4 (Ca + Mg) | |
|---|---|---|---|---|---|---|---|---|---|
| (° F.) | (° C.) | (Ksi) | (MPa) | (Ksi) | (MPa) | (Ksi) | (MPa) | (Ksi) | (MPa) |
| 1700 | 927 | 63 | 434 | 68 | 469 | 64 | 441 | 70 | 483 |
| 1800 | 982 | 51 | 352 | 45 | 310 | 51 | 352 | 49 | 338 |
| 1900 | 1038 | 37 | 255 | 41 | 283 | 41 | 283 | 43 | 297 |
| 2000 | 1093 | 32 | 221 | 30 | 207 | 32 | 221 | 38 | 262 |
| 2100 | 1149 | 29 | 200 | 25 | 172 | 23 | 158 | 28 | 193 |
| 2200 | 1204 | 20 | 138 | 20 | 138 | 18 | 124 | 22 | 152 |
| 2250 | 1232 | 19 | 131 | 1 | 7 | 16 | 110 | 17 | 117 |
| 2300 | 1260 | 1 | 7 | — | — | — | — | 7 | 48 |

Figure 3:
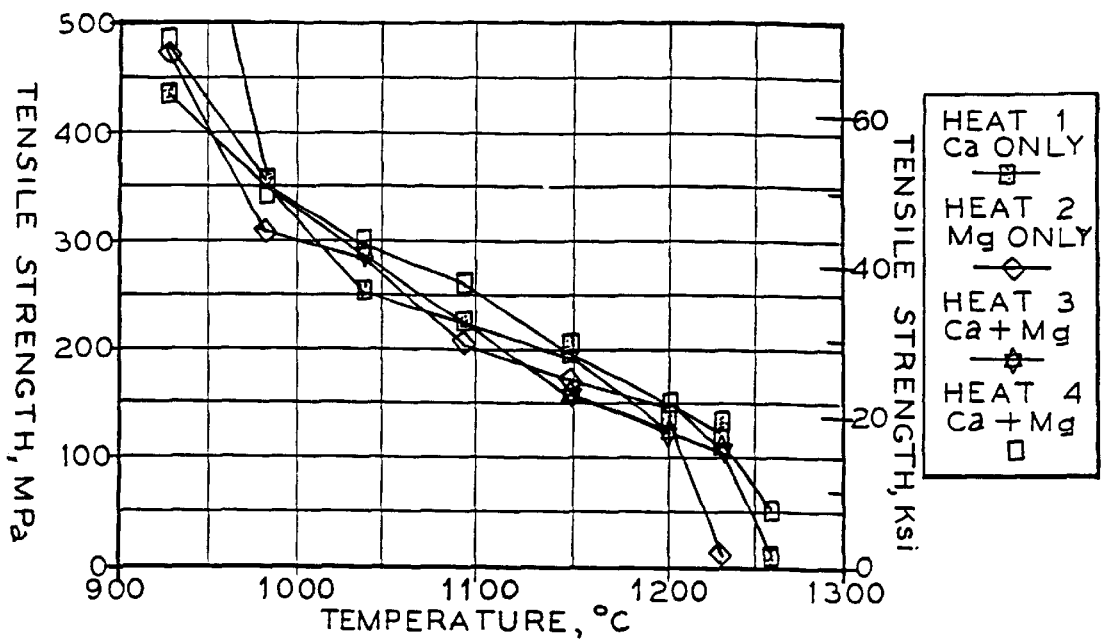
FIG. 3 illustrates the minimal tensile strength impact of using a combination of alkaline earth metals in "as-hot-rolled" nickel-base alloys containing α-phase chromium.

FIG. 3 converts the data of Table 4 into a graph to illustrate the minimal impact in tensile strength arising from the combination of materials in the "as-hot-rolled" condition. The calcium and magnesium combine to increase hot ductility without any detrimental drop in physical properties.

Table 5 below illustrates that the combination of calcium and magnesium have minimal impact upon tensile strength of alloys of the invention in the as-hot-rolled and annealed condition.

TABLE 5

| Temperature | | 1 (Ca only) | | 2 (Mg only) | | 3 (Ca + Mg) | | 4 (Ca + Mg) | |
|---|---|---|---|---|---|---|---|---|---|
| (° F.) | (° C.) | (Ksi) | (MPa) | (Ksi) | (MPa) | (Ksi) | (MPa) | (Ksi) | (MPa) |
| 1700 | 927 | 55 | 379 | 55 | 379 | 56 | 386 | 55 | 379 |
| 1800 | 982 | 48 | 331 | 49 | 338 | 46 | 317 | 48 | 331 |
| 1900 | 1038 | 42 | 290 | 40 | 276 | 39 | 269 | 42 | 290 |
| 2000 | 1093 | 35 | 241 | 29 | 200 | 33 | 228 | 30 | 207 |
| 2100 | 1149 | 27 | 186 | 27 | 186 | 23 | 158 | 27 | 186 |

Figure 4:
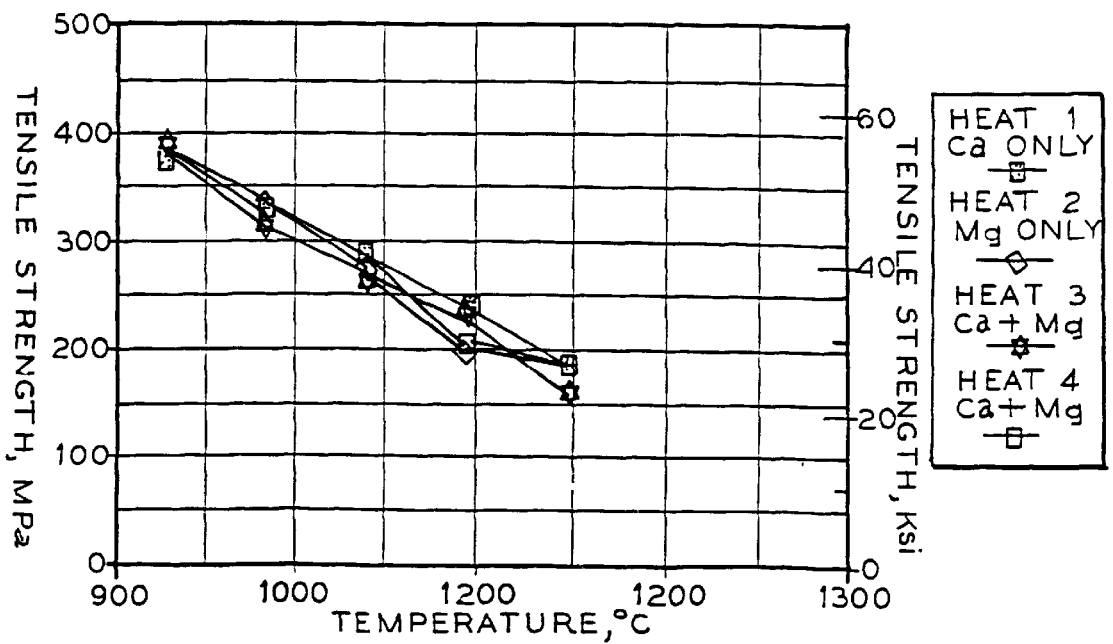
FIG. 4 illustrates the minimal tensile strength impact of using a combination of alkaline earth metals in annealed nickel-base alloys containing α-phase chromium.

FIGS. 3 and 4 illustrate that the calcium and magnesium of the invention do not promote the formation of detrimental precipitates.

Table 6 below demonstrates the enhanced hot workability achieved by limiting the boron, rare earths and zirconium concentrations.

TABLE 6

| TEMPERATURE | | REDUCTION IN AREA (%) | | | |
|---|---|---|---|---|---|
| | | AS-HOT-ROLLED | | ANNEALED | |
| | | 5 | A | 5 | A |
| (° F.) | (° C.) | 0.0204* | 0.0025* | 0.0204* | 0.0025* |
| 1700 | 927 | 55 | 96 | 44 | 78 |
| 1800 | 982 | 71 | 98 | 52 | 79 |
| 1900 | 1038 | 90 | 99 | 79 | 87 |
| 2000 | 1093 | 97 | 98 | 89 | 88 |
| 2100 | 1149 | 96 | 97 | 95 | 94 |
| 2200 | 1204 | 96 | 97 | 96 | 97 |
| 2250 | 1232 | 73 | — | — | — |

TABLE 6-continued

| TEMPERATURE | | REDUCTION IN AREA (%) | | | |
|---|---|---|---|---|---|
| | | AS-HOT-ROLLED | | ANNEALED | |
| | | 5 | A | 5 | A |
| (° F.) | (° C.) | 0.0204* | 0.0025* | 0.0204* | 0.0025* |
| 2300 | 1260 | 0.1 | 96 | — | — |
| 2350 | 1288 | — | 51 | — | — |

*B + Rare Earths + Zr

Figure 5:
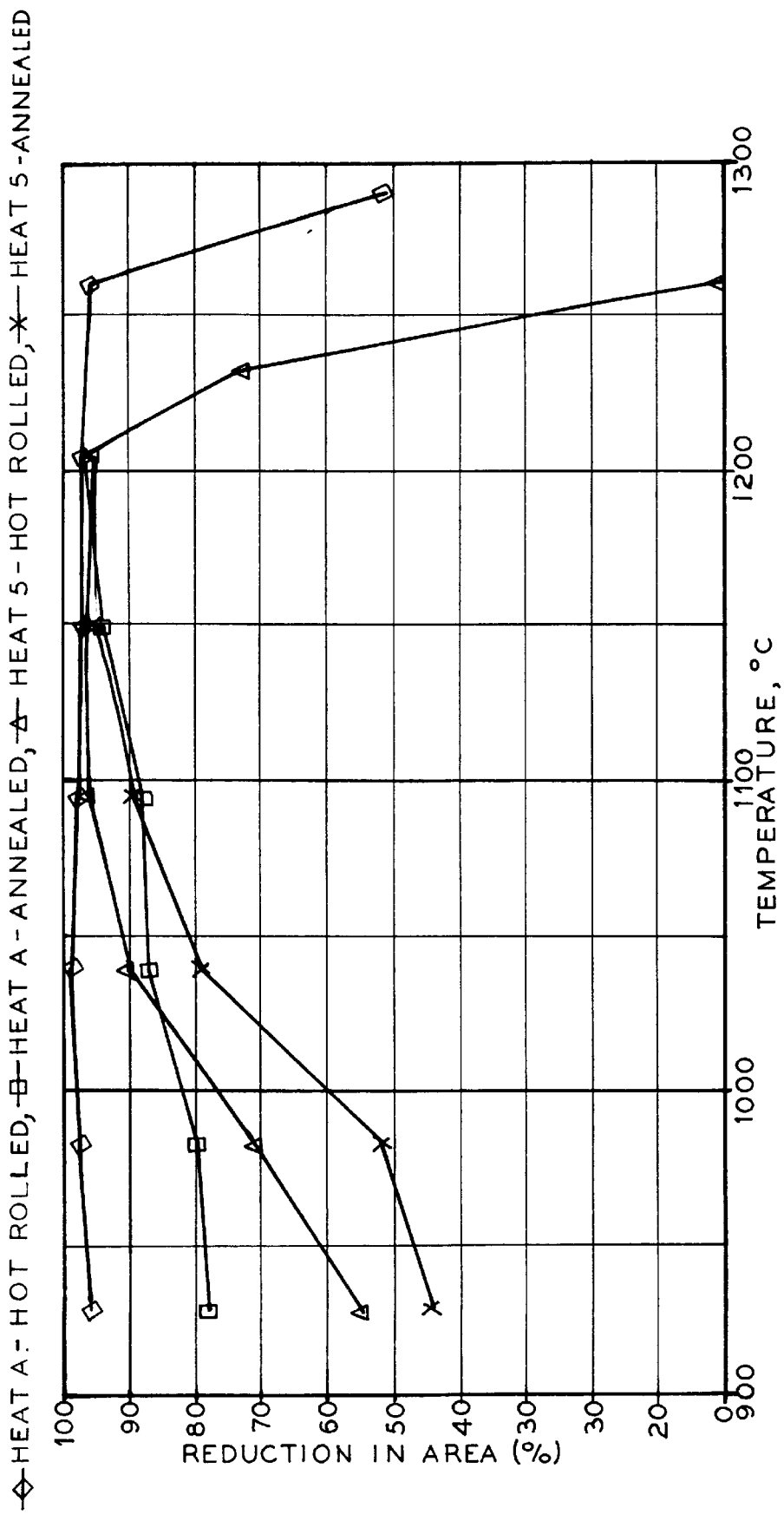
FIG. 5 illustrates the ductility increase achieved from control of boron and zirconium concentrations.

Referring to FIG. 5, limiting the boron, rare earths and zirconium concentrations greatly increases ductility at temperatures of 950° C. This appears to increase ductility by limiting grain boundary precipitation. Limiting the grain boundary precipitates is most effective for increasing ductility of the annealed alloy. Furthermore, limiting boron, rare earths and zirconium to impurity levels appears to have little or no adverse affect on tensile properties.

Hot working the alloy at a temperature of at least 800° C. allows significant deformation of the alloy without cracking. Furthermore, hot working at a temperature of at least 900°

C. allows greater alloy deformation without cracking. Most advantageously, hot rolling wire at a temperature of at least 1000° C. prevents the surface slivering often associated with α-phase chromium alloys.

In practice, working the commercial-scale alloy 72 ingot down to wire presented no significant ductility problems. In fact, hot rolling 0.25 in. (0.64 mm) wire had much improved surface quality over traditional product. Five of six coils of wire hot rolled to size with no slivers—the wire of one coil had very light slivers. Excessive exposure to an annealing temperature of 2225° F. (1218° C.) caused the light slivering. The joint addition of calcium and magnesium increased the commercial yield of filler metal 72 at least 50 percent.

Table 7 below discloses the ranges of the new alloy in weight percent. Advantageously, the alloys have "about" the range of Table 6, along with incidental impurities.

TABLE 7

| ELEMENT | BROAD | INTERMEDIATE | NARROW |
|---|---|---|---|
| Cr | 42–65 | 42–55 | 42–52 |
| Ca | 0.002–0.1 | 0.002–0.05 | 0.003–0.03 |
| Mg | 0.002–0.1 | 0.002–0.05 | 0.003–0.03 |
| Ni | Balance | Balance | Balance |
| Al | 0–2 | 0–1.5 | 0–1 |
| Ag | 0–0.1 | 0–0.07 | 0–0.05 |
| B | * | <0.0008** | <0.0005*** |
| C | 0–0.2 | 0–0.15 | 0–0.1 |
| Ce | 0–0.1 | 0–0.07 | 0–0.05 |
| Co | 0–5 | 0–3 | 0–1 |
| Cu | 0–3 | 0–2 | 0–1 |
| Fe | 0–5 | 0–3 | 0–1 |
| La | * | ** | *** |
| Mn | 9–5 | 0–3 | 0–1 |
| Mo | 0–3 | 0–2 | 0–1 |
| Nb | 0–3 | 0–2 | 0–1 |
| P | 0–0.1 | 0–0.07 | 0–0.05 |
| S | 0–0.1 | 0–0.07 | 0–0.05 |
| Si | 0–2 | 0–1.5 | 0–1 |
| Ta | 0–3 | 0–2 | 0–1 |
| Ti | 0–5 | 0–3 | 0–1 |
| V | 0–5 | 0–3 | 0–1 |
| W | 0–5 | 0–3 | 0–1 |
| Zn | 0–1 | 0–0.7 | 0–0.5 |
| Zr | * | ** | *** |
| Rare Earths | * | ** | *** |

*Total B + Rare Earths + Zr is less than 0.005
**Total B + Rare Earths + Zr is less than 0.004
***Total B + Rare Earths + Zr is less than 0.003

The alloy has sufficient hot workability for hot rolling nickel-base alloy with greater than 42 weight percent chromium into wire without slivering. The combination of calcium and magnesium also improves the hot working range for these high-chromium alloys, such as filler metal 72. Furthermore, the alloy increases hot workability without any detrimental decrease in mechanical properties, such as tensile strength. The improved hot workability improves hot rolling, extruding and weldability of the alloy. Finally, the addition of calcium and magnesium in combination with impurity levels of boron and zirconium increases commercial yield of hot rolled wire greater than fifty percent.

While in accordance with the provisions of the statute, this specification illustrates and describes specific embodiments of the invention. Those skilled in the art will understand that the claims cover changes in the form of the invention and that certain features of the invention provide advantages without the use of other features.

We claim:

1. A method for working nickel-chromium alloys comprising:
   a) providing an object consisting essentially of, by weight percent, over 43 to about 65 chromium, about 0.002 to 0.1 calcium, about 0.002 to 0.1 magnesium, less than about 0.005 total boron, rare earths and zirconium and balance nickel and incidental impurities; and
   b) hot working said object at a temperature of at least 800° C. to alter the shape of said object into wire.

2. The method of claim 1 wherein said hot working alters the shape of said object at a temperature of at least 900° C.

3. A method for working nickel-chromium alloys comprising:
   a) providing an object consisting essentially of, by weight percent, over 43 to about 65 chromium, about 0.002 to 0.1 calcium, about 0.002 to 0.1 magnesium, about 0 to 2 aluminum, about 0 to 5 cobalt, about 0 to 3 copper, about 0 to 5 iron, about 0 to 5 manganese, about 0 to 3 molybdenum, about 0 to 3 niobium, about 0 to 2 silicon, about 0 to 3 tantalum, about 0 to 5 titanium, about 0 to 5 tungsten, about 0 to 5 vanadium, about 0 to 1 zinc, about 0 to 0.2 carbon, about 0 to 0.1 silver, about 0 to 0.1 cerium, about 0 to 0.1 phosphorus, about 0 to 0.1 sulfur, less than about 0.005 total boron, rare earths and zirconium and balance nickel and incidental impurities; and
   b) hot working said object at a temperature of at least 800° C. to alter shape of said object into wire.

4. The method of claim 3 wherein said hot working alters the shape of said object at a temperature of at least 900° C.

5. A method for working nickel-chromium alloys comprising:
   a) providing an object consisting essentially of, by weight percent, over 43 to about 55 chromium, about 0.002 to 0.05 calcium, about 0.002 to 0.05 magnesium, about 0 to 1.5 aluminum, about 0 to 3 cobalt, about 0 to 2 copper, about 0 to 3 iron, about 0 to 3 manganese, about 0 to 2 molybdenum, about 0 to 2 niobium, about 0 to 1.5 silicon, about 0 to 2 tantalum, about 0 to 3 titanium, about 0 to 3 tungsten, about 0 to 3 vanadium, about 0 to 0.7 zinc, less than 0.0008 boron, about 0 to 0.15 carbon, about 0 to 0.07 silver, about 0 to 0.07 cerium, about 0 to 0.07 phosphorus, about 0 to 0.07 sulfur, less than about 0.004 total boron, rare earths and zirconium and balance nickel and incidental impurities; and
   b) hot working said object at a temperature of at least 800° C. to alter shape of said object into wire.

6. The method of claim 5 wherein said hot working alters the shape of said object at a temperature of at least 900° C.

7. The method of claim 5 wherein said alloy contains over 43 to about 52 chromium, about 0.003 to 0.03 calcium, about 0.003 to 0.03 magnesium, about 0 to 1 aluminum, about 0 to 1 cobalt, about 0 to 1 copper, about 0 to 1 iron, about 0 to 1 manganese, about 0 to 1 molybdenum, about 0 to 1 niobium, about 0 to 1 silicon, about 0 to 1 tantalum, about 0 to 1 titanium, about 0 to 1 tungsten, about 0 to 1 vanadium and about 0 to 0.5 zinc, less than about 0.0005 boron, less than 0.003 total boron, rare earths and zirconium, about 0 to 0.1 carbon, about 0 to 0.05 silver, about 0 to 0.05 cerium, about 0 to 0.05 phosphorus and about 0 to 0.05 sulfur and balance nickel and incidental impurities.

* * * * *